United States Patent [19]

De Laney et al.

[11] 3,837,874
[45] Sept. 24, 1974

[54] BLACK PIGMENT AND METHOD OF MAKING SAME
[75] Inventors: George B. De Laney, Detroit; Robert D. Shannon, Ann Arbor, both of Mich.
[73] Assignee: Ebonex Corporation, Melvindale, Mich.
[22] Filed: July 12, 1973
[21] Appl. No.: 378,752

[52] U.S. Cl. .............................. 106/307, 106/308 B
[51] Int. Cl.............................................. C08h 17/08
[58] Field of Search ........................ 106/307, 308 B

[56] References Cited
UNITED STATES PATENTS
2,895,841   7/1959   Rogers.............................. 106/307

*Primary Examiner*—Delbert E. Gantz
*Assistant Examiner*—J. V. Howard
*Attorney, Agent, or Firm*—Fisher, Krass, Young & Gerhardt

[57] ABSTRACT

A black pigment for use in paints and the like consists of diatomaceous earth and activated carbon saturated with color bodies derived from unclarified corn syrup. The diatomaceous earth and activated carbon employed in the pigment are coated on a screen used as a filter as part of a decoloring step in corn syrup production. When the coating becomes saturated with color bodies from the syrup it is removed from the screen, washed with water to remove any residual syrup, and then dried by heating it at a low temperature. The dried material is then crushed in a ball mill and graded as to particle size in an air separator to achieve a desired size range.

9 Claims, No Drawings

BLACK PIGMENT AND METHOD OF MAKING SAME

BACKGROUND OF THE INVENTION

1. Field of the Invention

This invention relates to black pigment consisting of diatomaceous earth and activated carbon saturated with color bodies derived from corn syrup to a method of producing the pigment utilizing the discards from a corn syrup decoloration process.

2. Prior Art

Black pigments for providing color to paints, plastics, rubbers and the like are largely produced with various carbon raw materials. Carbon black, the most commonly used black pigment, is produced by burning relatively high hydrocarbon fractions while lamp black, a higher quality pigment, is produced by burning the lighter fractions. Bone black is produced by burning animal bone in a limited oxygen atmosphere. This latter material is too expensive for direct use as a pigment and is generally first used as a filter material in sugar production where it is useful in removing the color bodies from the syrups. After the bone black is clogged with color bodies it may be cleaned and reused. In this process of use and regeneration some of the bone particles become too fine for use in the filtering process and these discards have previously been used as pigment.

While a wide variety of black, granular materials could be used as pigments a desirable pigment must possess several characteristics. First the hiding power of the material, i.e., its ability to cover a previous coating is an important property. The hiding power is a function of the material's mass-color, i.e., the jetness of the pigment itself and that of the individual particles, the particle configuration and size distribution. A second factor is the dispersibility of the pigment in various medias. This dispersibility is an inverse function of the materials' surface tension, and measures the ability of the material to be wetted by various media. The easier the dispersibility of the pigment the less pigment and the less vehicle are required in the paint system, since one of the functions of the solvent plus the vehicle is to decrease the surface tension of the liquid so that it thoroughly wets the pigment. Another factor is the tinting strength of a pigment or the ability of the pigment to color a base. A further property of a pigment is its undertone. Certain blacks have brown undertones and other blacks have blue undertones. In general the blue undertone is more desirable since it gives a mass appearance of a more intense black. An overriding criteria is that the material be relatively low in cost since the mass produced products in which the pigments are used are generally highly competative in price.

SUMMARY OF THE INVENTION

The present invention is directed to a black pigment which meets all of the functional criteria for extensive use in paints, plastics, artificial leathers, artist colors and crayons, and is relatively low in cost, as well as to a method of making that pigment.

The pigment of the present invention primarily consists of a mixture of diatomaceous earth and activated carbon which has been saturated with color bodies derived from raw corn syrup. The diatomaceous earth and activated carbon are used to coat the screens employed to decolor corn syrup in a corn syrup production process. When the coating materials are saturated with the color bodies and minerals that they remove from the syrup primarily by an adsorption process, they are removed from their supporting screens, are washed of syrup and the resultant paste or slurry is dried by heating it at below 300° F. The dried material is then ground in a mill and then graded according to particle size by an air separation process to produce the pigment.

In the production of corn syrup, corn starch is first hydrolyzed and this process produces as a byproduct the color bodies. When the resulting syrup is refined the first step involves reacting it with an alkali, a process termed defecation, to produce percipitates. The liquor from this step is then filtered through a continuous cloth type filter to remove impurities from the syrup. It is then passed through the screen coated with diatomaceous earth and activated carbon.

The activated carbon used to coat the screen is produced by the destructive distillation, in a limited oxygen atmosphere, of either lignite or vegetable carbon to eliminate the volatile hydrocarbon components. Products of this distillation are then treated with superheated steam, hydrogen or mixtures of hydrogen and oxygen to effectively puff the particles, increase their surface area, and activate the carbon.

The diatomaceous earth actually acts to expand the thickness of the cloth filtering screen since it has a filtering consistency similar to that of the cloth and it piles up on the cloth and prevents the finer activated carbon from clogging the cloth by providing a large number of flow channels through the coating material. Accordingly, to prepare a filter it is first coated with diatomaceous earth and then the activated carbon is applied to it. When the corn syrup is passed through this filter the activated carbon attracts and retains the color bodies, clarifying the syrup.

When the activated carbon becomes saturated with color bodies it loses its ability to clarify the syrup. While certain processes are available for reactivating the carbon, the economics of the reactivation process are such that the spent carbon, along with its associated diatomaceous earth, are usually discarded after they are "sweetened off" or washed to remove as much sugar as possible.

In the practice of the present invention this previously discarded paste is first heated at slightly below 300°F. until it is completely dried. It is then ground in a mill and passed through an air separation process to grade the particles as to size. Various size particles may then be selected or combined to produce pigments for particular applications.

We have found that the pigment thus produced has a covering power and the desirable blue undertone both akin to the properties of lamp black. It has tinting properties similar to carbon black and a higher degree of dispersibility than either lamp black or carbon black. The present pigments also have very low adsorption capabilities so that they do not tend to bleach out and adsorb other organic pigments which are added to a coloring system in addition to this black pigment.

The low adsorption capability of the present pigment is to be contrasted with the quite high adsorption capacity of the raw activated carbon. The adsorption of the color bodies in the syrup refining process greatly reduces the adsorption capacity of the carbon. At the same time the color bodies develop the highly desirable blue undertone. Accordingly, when compared to a pigment prepared using raw activated carbon and diatomaceous earth the present product would not only be much less expensive but would be much more desirable as a pigment because of its lower adsorption capacity and the blue undertones.

The exceptionally high dispersibility, or low surface tension of the pigments of the present invention allows the use of unusually low percentages of solvents and vehicles in the paint system which is of importance from both the economic standpoint since solvent vapor is an air pollutant. The high dispersibility of this carbon pigment makes it useful in almost any paint system such as oil based, water base, latex, or polyurethane, epoxies and so on. Accordingly, when this pigment is joined with one of the known universal bases a highly versatile system is achieved.

The changes effected in the activated carbon by virtue of its use in the syrup clarification process are critical to the present invention. By way of example, diatomaceous earth and activated carbon are also used for the production of refined cane syrup and sugar from raw cane. That process differs from the production of corn syrup in the use of an acid defecation process rather than the alkali defecation process used with corn syrup. We have processed and tested and activated carbon-diatomaceous earth from that cane syrup clarification process and found that the resulting material is not useful as a black pigment, possibly because the acid process removes some of the color bodies which are later picked up by the activated carbon in the alkali process or alternatively because the acid defecation process leaves some residue in the syrup that is picked up by the activated carbon. In any event it must be emphasized that the complex set of criteria for a desirable black pigment are rarely realized in black powders. The activated carbon-diatomaceous earth discards used in the present process not only contain the color bodies but small percentages of minerals, such as calcium, which is picked up from the syrup. Accordingly the compositions of the present pigments are approximately 40–60 percent carbon and the balance largely in the form of diatomaceous earth with very small percentages of the color bodies and various minerals.

DETAILED DESCRIPTION

The method of production of the pigments of the present invention is associated with the manufacture of corn syrup based upon the hydrolysis of corn starch using an acid catalyst. This process has been used for many years and is the principal source of corn syrup in the United States.

The hydrolysis typically used hydrochloric acid and elevated conditions of temperature and pressure. After the hydrolysis the acid is neutralized, typically with sodium carbonate and the syrups and sugars resulting from the process are clarified.

In the process of interest in the production of the present pigments an alkali defecation is the first step in clarification and produces the precipitation of certain impurities. The resulting liquor is then mechanically filtered, usually employing a continuous cloth filter to remove various nonsoluble impurities. Next the partially clarified liquor is passed through a fine screen coated first with diatomaceous earth and then with activated carbon.

The activated carbon used in connection with the present invention may be any type prepared by heating a carbonaceous material at red heat. The carbon is then further activated by treatment at high temperatures with steam, carbon dioxide, nitrogen, oxygen, hydrogen, chloride, chlorine, sulphur dioxide, etc. A method of preparing a particular type of activated carbon is described in *Industrial and Engineering Chemistry*, Volume 34, No. 5, May, 1942 at pages 603 et seq. References to other related processes are listed in that article.

The screen is first coated with diatomaceous earth by passing a flow containing diatomaceous earth through the screen and is then similarly coated with the activated carbon.

As the corn syrup liquor is passed through this coated filter the activated carbon acts to pick-up color bodies and various mineral impurities from the liquor largely through an adsorption process. This is usually the final step in the clarification of the corn syrup.

After use for some period of time the activated carbon becomes saturated with the color bodies and loses its ability to remove further color bodies from the syrup. While processes are available for reactivating the carbon, such as that described in U.S. Pat. No. 2,763,580 to J. W. Zabor, such reactivation is not commonly employed in this country. More typically the activated carbon and diatomaceous earth are washed "sweetened off" on the screen to remove the residual corn syrup. The resultant filter cake is then discarded.

In the practice of the present invention this filter cake is dried by heating it in a dryer at slightly below 300° F. This heating process removes the water and also destroys any bacteria that may be associated with the materials.

When the materials are fully dried they are ground in a mill until the largest particles are approximately 20 microns in diameter. The ground material is then passed through an air separation process. Typically three separations chambers will be employed and the ground pigment may be separated into particles of less than 7 micron size, 7–10 microns in size, and greater than 10 microns in size.

The pigment for a particular application may be prepared by selecting one of these sizes or by blending proportions of various sizes, depending upon the particular pigment system required. The larger particles may be returned to the mill for regrinding.

The embodiments of the invention in which an exclusive property or privilege is claimed are defined as follows.

Having thus described our invention we claim:

1. A black pigment consisting of diatomaceous earth and carbon saturated with color bodies derived from unclarified corn syrup.

2. The pigment of claim 1 wherein the color bodies are derived from unclarified corn syrup by passing the corn syrup through a screen coated with said diatomaceous earth and activated carbon.

3. A method of producing a black pigment consisting of coating a screen with diatomaceous earth and activated carbon; passing unclarified corn syrup containing color bodies through the coated screen so that the activated carbon adsorbs color bodies; washing the diatomaceous earth and activated carbon to remove the remaining corn syrup; removing the diatomaceous earth and carbon from the screen; drying the resultant slurry of diatomaceous earth and carbon; and grinding the dried slurry in a mill.

4. The method of claim 3 including the additional step of separating the ground diatomaceous earth and carbon according to fineness in an air separator.

5. The method of claim 3 wherein the unclarified corn syrup which is passed through the coated screen has previously undergone an acid defecation process.

6. The method of producing black pigment comprising drying the slurry produced in the washing of saturated diatomaceous earth and carbon discards from a corn syrup clarification process and grinding the dried discards.

7. The method of claim 6 including the additional step of separating the ground dried discards in an air separator.

8. The method of claim 6 wherein the slurry is dried by heating it below 300° F.

9. The method of claim 6 wherein the corn syrup clarification process includes an alkali defecation step.

* * * * *